United States Patent
Hamlet

(10) Patent No.: US 9,985,792 B1
(45) Date of Patent: May 29, 2018

(54) DATA TO HARDWARE BINDING WITH PHYSICAL UNCLONABLE FUNCTIONS

(71) Applicant: National Technology & Engineering Solutions of Sandia, LLC, Albuquerque, NM (US)

(72) Inventor: Jason Hamlet, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 150 days.

(21) Appl. No.: 15/077,590

(22) Filed: Mar. 22, 2016

Related U.S. Application Data

(60) Provisional application No. 62/138,069, filed on Mar. 25, 2015.

(51) Int. Cl.
  *G06F 21/00* (2013.01)
  *H04L 9/32* (2006.01)

(52) U.S. Cl.
  CPC .......... *H04L 9/3278* (2013.01); *H04L 9/3247* (2013.01)

(58) Field of Classification Search
  CPC .................................. G06F 21/60; H04L 9/32
  See application file for complete search history.

(56) References Cited

U.S. PATENT DOCUMENTS

| | | | |
|---|---|---|---|
| 7,055,040 B2 | 5/2006 | Klemba et al. | |
| 2015/0318994 A1* | 11/2015 | Walsh | H04L 9/3236 713/182 |

OTHER PUBLICATIONS

Altera, "Design Perspective: Protecting Intellectual Property Through FPGA Design Security", Retrieved at <<http://www.altera.com/literature/ads/fpgadesignsecurity.pdf>>, 2006, p. 1.
Parno, et al., "Bootstrapping Trust in Commodity Computers" Proceedings of IEEE Symposium on Security and Privacy, May 2010, pp. 1-16.
Smerdon, M., "Security Solutions Using Spartan-3 Generation FPGAs", Xilinx Whitepaper WP266, v1.1, Apr. 22, 2008, pp. 1-12.

\* cited by examiner

*Primary Examiner* — Izunna Okeke
(74) *Attorney, Agent, or Firm* — Medley, Behrens & Lewis, LLC

(57) ABSTRACT

The various technologies presented herein relate to binding data (e.g., software) to hardware, wherein the hardware is to utilize the data. The generated binding can be utilized to detect whether at least one of the hardware or the data has been modified between an initial moment (enrollment) and a later moment (authentication). During enrollment, an enrollment value is generated that includes a signature of the data, a first response from a PUF located on the hardware, and a code word. During authentication, a second response from the PUF is utilized to authenticate any of the content in the enrollment value, and based upon the authentication, a determination can be made regarding whether the hardware and/or the data have been modified. If modification is detected then a mitigating operation can be performed, e.g., the hardware is prevented from utilizing the data. If no modification is detected, the data can be utilized.

17 Claims, 12 Drawing Sheets

DATA TO HARDWARE BINDING WITH PHYSICAL UNCLONABLE FUNCTIONS

RELATED APPLICATION

This application claims priority to U.S. Provisional Patent Application No. 62/138,069, filed on Mar. 25, 2015, and entitled "SOFTWARE TO HARDWARE BINDING WITH PHYSICAL UNCLONABLE FUNCTIONS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Techniques for protecting the integrity and/or confidentiality of data (e.g., software) may utilize message authentication codes (MACs) and encryption. However, by eliminating the necessity of storing and protecting keys, increased security of these techniques can be realized by making them less vulnerable to key extraction attacks.

There are several commercially available protections for field programmable gate arrays (FPGAs), wherein the protections can utilize encryption of a bitstream(s), e.g., via advanced encryption standard (AES). One solution utilizes an AES key that is one-time programmable and stored in non-volatile memory in the FPGA. Another solution stores the AES key in volatile memory on a device with a battery backup, in combination with a unique identifier (signature) that is hardcoded into the FPGA during manufacturing. During an initial enrollment process, a user-defined function value of the identifier is computed and stored on the system. At a later time, when the FPGA is again configured the computation is repeated and compared to the enrolled value.

However, these techniques are fundamentally insecure as they rely on secrets that are stored in nonvolatile (or battery backed volatile) memory on the device. This creates opportunities for key extraction and can also introduce a key storage problem. In the case of the unique identifier, the enrolled value must also be protected so that it cannot be extracted and used to spoof the verification step in a replay attack.

After a foundation of trust is established for the hardware, it is desirable that this trust be extended to a data to be employed by the hardware. Data cannot itself be secured by other data since, in this scenario, security data and malicious data exist within the same execution context. By consequence, no advantage is available to either side because any action taken by one side may also be taken or altered by the other side.

SUMMARY

The following is a brief summary of subject matter that is described in greater detail herein. This summary is not intended to be limiting as to the scope of the claims.

The various technologies presented herein relate to binding data (e.g., software) to hardware, wherein the data is to be utilized by the hardware. The generated binding can be utilized to detect whether at least one of the hardware or the data has been modified between an initial moment (enrollment) and a later moment (authentication). In an embodiment, during enrollment, a cryptographic key is generated based on a signature (an identifier) of the data, S, (e.g., a hash of the data content), a first response P from a physical unclonable function (PUF) located on the hardware, and code word C from an error correcting code. During authentication, a second response, P', can be generated from the PUF, and optionally a second code word C', and such values can be used to ascertain whether the hardware is unmodified (e.g., P=P') and further, whether the data is also unmodified (e.g., S is constant through the enrollment and authentication processes). If modification is detected, then a mitigating operation can be performed, e.g., the data is prevented from executing on the hardware. If no modification is detected, then the data can by utilized by the hardware.

In another embodiment, the binding between the data and the hardware can be relaxed by removing the data signature from the PUF's helper data. As such, the PUF can be reproduced correctly even if the data is modified. In a further embodiment, an encrypted cryptographic key can be generated and authenticated.

In an embodiment, the PUF response is based upon an operational state of the PUF and/or the hardware device. Hence, if either, or both, of the PUF and/or the hardware device are modified then the PUF response is altered from a PUF response that would be obtained if the PUF and the hardware device were in their original, unmodified states.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
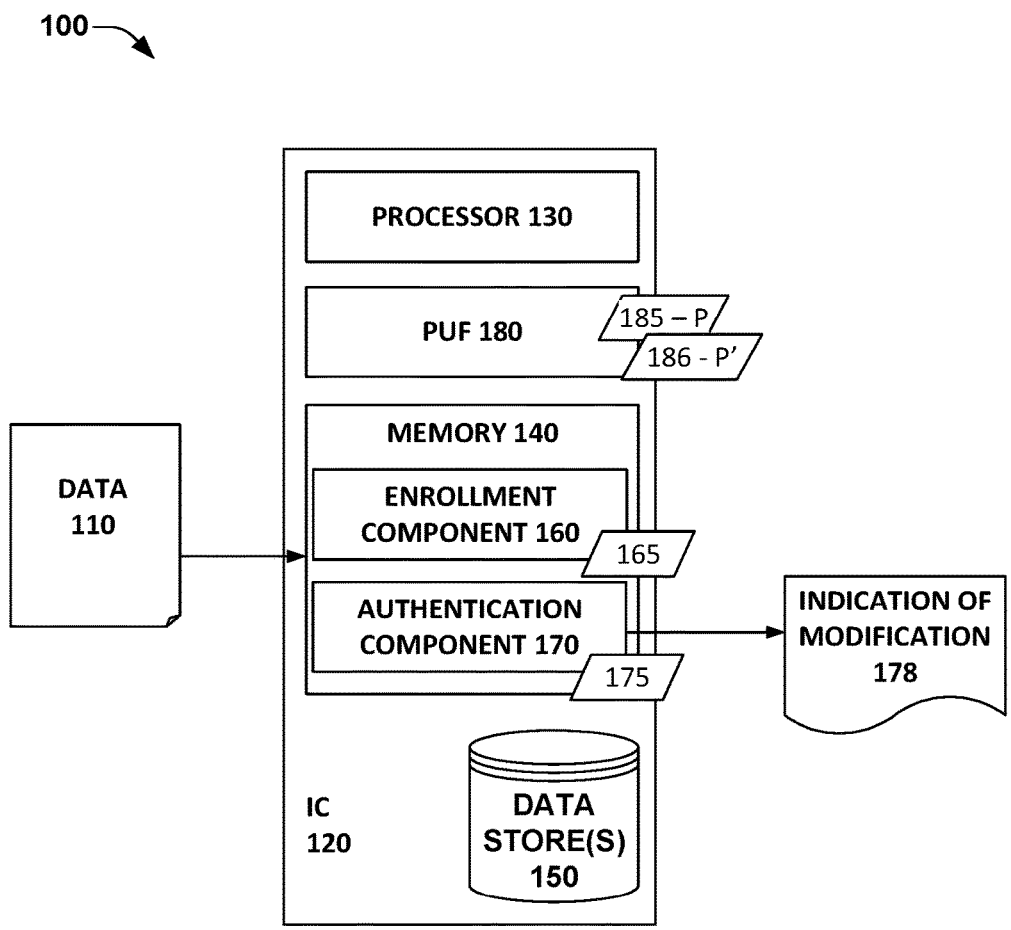
FIG. 1 is a block diagram of an exemplary computing system that is configured to bind data with hardware.

Various technologies pertaining to securely binding data to hardware are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, various techniques are available for binding data with hardware, wherein the data is to be utilized by (executed upon, employed by, used by) the hardware. However, such techniques are fundamentally insecure as they rely on secrets that are stored in nonvolatile (or battery backed volatile) memory on the device, which creates opportunities for key extraction and introduces a key storage problem.

To ensure secure binding between data and the hardware upon which it is to be utilized, an assurance is desired that neither the data nor the hardware have undergone any modification from a known initial condition. After a foundation of trust is established for the hardware (e.g., the hardware is unmodified), it is desirable that this trust be extended to any data to be utilized by the hardware (e.g., the data is also unmodified). Data cannot itself be secured by other data since, in this scenario, the security data and the malicious data exist within the same execution context. By consequence, no advantage is available to either side because any action taken by one side may also be taken or altered by the other side. Per the various embodiments presented herein, placing the primary security mechanism(s) in the hardware enables various defensive procedures to exist in a context below that of malicious data, undercutting the ability of the malicious data to disrupt the system.

For descriptive purposes herein, data is defined as any information and/or sequence of instructions that can be utilized by hardware; examples are software, compiled code, firmware, etc. Additionally, the term data is additionally intended to encompass FPGA bitstreams. In one or more situations it is desired that the integrity, confidentiality, or both of particular data is protected. For example, it is desired that the integrity of data that controls critical systems, such as medical devices, aircraft, infrastructure, etc., is protected. Commercial software companies (e.g., a data provider) may desire to encrypt their data to prevent competitors from analyzing it, and governments may need to encrypt data to protect classified information. As such, the following data security features may be desired:

a). Only authenticated data may be utilized by the hardware.

b). Only decrypted and authenticated data may be utilized by the hardware.

c). Data will only be utilized by one instance of hardware.

To achieve item (a) the data can authenticate itself to the hardware prior to utilization by the hardware. To achieve item (b), the data can be further encrypted with a key known to the hardware. To achieve item (c), the encryption key is known only to the hardware. In scenario (c), the hardware will only utilize authenticated data that the hardware itself previously encrypted; since only the hardware knows the decryption key the data cannot be utilized by (e.g., execute on) any other hardware.

Various embodiments described herein can provide the ability to bind data to the hardware that utilizes it. The various embodiments presented herein provide integrity of the data, and further, some can also provide confidentiality. In each exemplary embodiment the integrity, and confidentiality when applicable, is derived from a combination of a unique hardware identity, provided by a physical unclonable function (PUF), and an identity of the data, the data signature. For descriptive purposes herein, a hash of the data is used as its data signature; however, it is to be appreciated that other techniques for generating a data identity can also be utilized as applicable to the various embodiments presented herein. To facilitate understanding, an overview of a system for binding (enrolling) data with hardware, and subsequently analyzing the integrity of the binding (authentication) is presented, followed by various exemplary methods for binding of the data to the hardware and subsequent analysis of the binding.

FIG. 1 illustrates a system 100 that can be utilized to bind data with a hardware device that is configured to utilize the data (or be configured in accordance with the data). Data 110 can be received at a device 120 (e.g., an integrated circuit, hereinafter IC 120), wherein the IC 120 is configured to utilize the data 110. In an exemplary embodiment, the IC 120 comprises a processor 130 and memory 140, wherein the memory 140 comprises data that is accessible to the processor 130 and instructions that can be executed by the processor 130. A data store 150 can store data utilized by one or more components included in the IC 120. In an embodiment, the data 110 received at the IC 120 can be stored in the memory 140, in another embodiment, the data 110 can be stored in the data store 150 for retrieval by the processor 130.

The memory 140 can comprise an enrollment component 160 that is configured to generate an enrollment value 165, wherein the enrollment value 165 is generated based upon a hash(es), a key(s), helper data, etc., from the hardware and/or the data, as required to enable binding of the data 110 to the IC 120 (e.g., during an enrollment phase).

The memory 140 can further include an authentication component 170 that is configured to generate an authentication value 175, wherein the authentication value 175 is generated based upon the enrollment value 165, a hash, key, etc., utilized to generate the enrollment value 165, a newly generated hash(es), a newly generated key(s), error code, etc., as required to enable confirmation that one or more portions of the enrollment value 165 correspond and/or match with one of more portions of the authentication value 175 to facilitate confirmation of the binding between the data 110 and the IC 120, and further, that neither the data 110 and/or the IC 120 have been modified between the time at which the initial enrollment phase was undertaken and the time that the authentication is being performed.

The authentication component 170 can be further configured to generate an indication 178 of whether the data 110 and the IC 120 are still in their original state (e.g., their respective states at the time of enrollment). In response to determining that respective data in the enrollment value 165 and the authentication value 175 match, the indication 178 can indicate that the IC 120 and data 110 are functioning as desired. In response to determining that the enrollment value 165 and the authentication value 175 do not match, the indication 178 can indicate that the IC 120 and data 110 are not functioning as desired, whereupon a subsequent operation can be performed, e.g., the authentication component 170 can attempt to reauthenticate the enrollment value 165, utilization (e.g., execution) of the data 110 by the IC 120 can be terminated, a secondary operation that relies upon the indication 178 being in an expected state can be prevented from executing, etc.

As previously mentioned, the enrollment value 165 can be generated in conjunction with a PUF 180, wherein, in response to a stimulus applied to the PUF 180, the PUF 180 can generate an initial PUF value 185 (P) which can be utilized to generate the enrollment value 165. A subsequent stimulus can be applied to the PUF 180 to generate a subsequent PUF value 186 (P') as part of either generation of the enrollment value 165 and/or the authentication value 175.

It is to be appreciated that while the enrollment value 165 and the authentication value 175 are depicted in FIG. 1 as being separate items (e.g., different keys), the authentication value 175 can be a derivation of the enrollment value 165. For example, the authentication value 175 can be based upon the enrollment value 165, e.g., the enrollment value 165 is generated in conjunction with the response 185 (P), and authentication of the enrollment value 165 is performed as a function of the subsequent response 186 (P') being applied to the enrollment value 165 to form the authentication value 175.

A plurality of embodiments are now presented in FIGS. 2-9, wherein FIGS. 2-5 relate to "strict hardware to data binding", while FIGS. 6-9 relate to "relaxed hardware to data binding". As further described herein, a plurality of enrollment and authentication processes can be performed based upon different combinations of one or more hashes, keys, error codes, encryption operations, etc., utilized to generate the enrollment value 165 and/or the authentication value 175. In the various embodiments the following nomenclature is utilized: the PUF 180 of IC 120 (D) has an initial output value P and a future, noisy output value P'. C is a code word from an error correcting code, e is an error vector, and h( ) is a one-way hash function. Binding the data 110 (S) to the IC 120 can protect the integrity of the data 110 or prevent use of the data by unintended hardware.

The various embodiments presented herein utilize a fuzzy extraction procedure based upon $h(P \oplus C)$ in connection with ascertaining a PUF output value, wherein a combination of the PUF response P and a data signature S are utilized, e.g., $h(P \oplus S \oplus C)$, or a variation thereof. In one or more embodiments presented with strict hardware to data binding, hardware and data can be bound together by preventing correct recovery of the PUF value if either the hardware or the data is modified. Further, some embodiments can provide data integrity. The binding can be accomplished by incorporating the data signature (e.g., a hash of the data) in the PUF's fuzzy extraction procedure during an enrollment process. Later, if a modified version of the data is presented to the hardware then the PUF will not be recovered correctly and the modified data will not be authenticated. This functionality can be utilized to prevent hardware from utilizing (e.g., executing) data with which it has not previously been enrolled. In an embodiment, the data signature S can be generated based upon at least one value in the data, e.g., a hash of the values included in the data.

Figure 2:
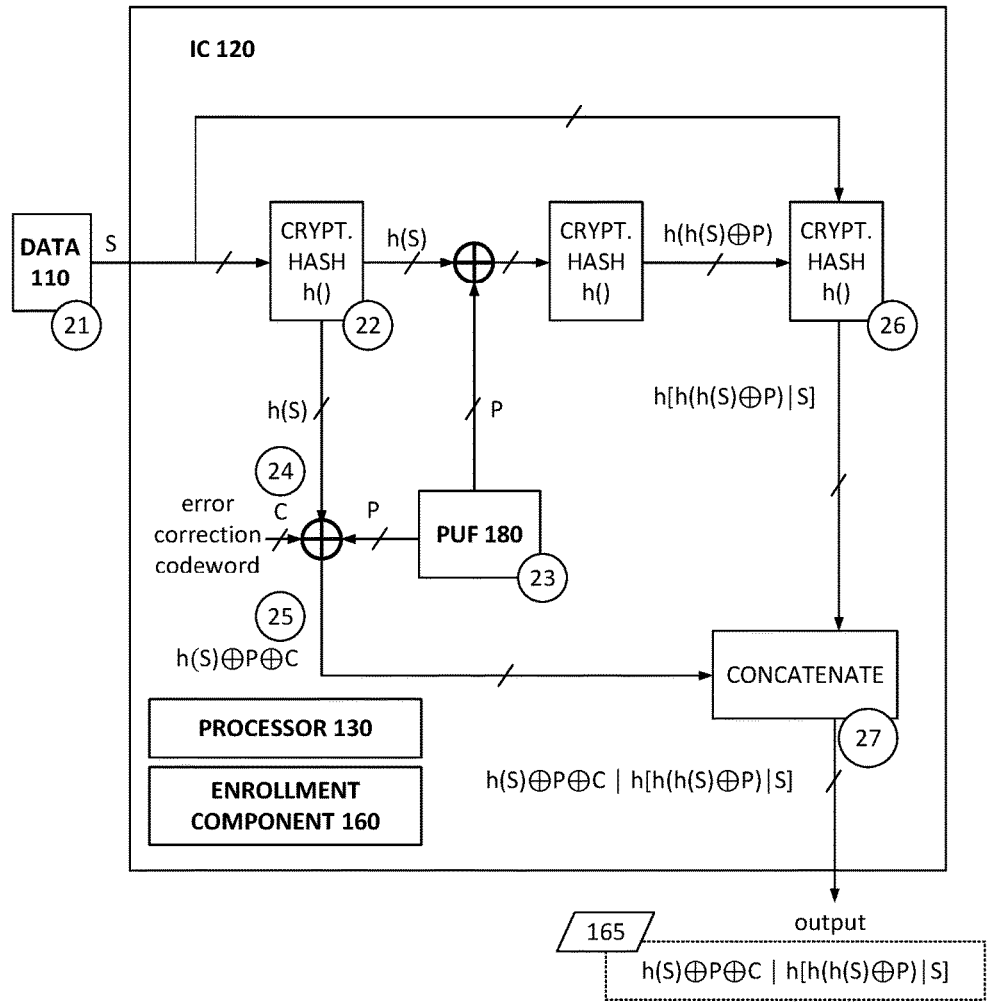
FIG. 2 illustrates a schematic of an enrollment operation in a strict hardware to data binding operation, according to an embodiment.
Figure 3:
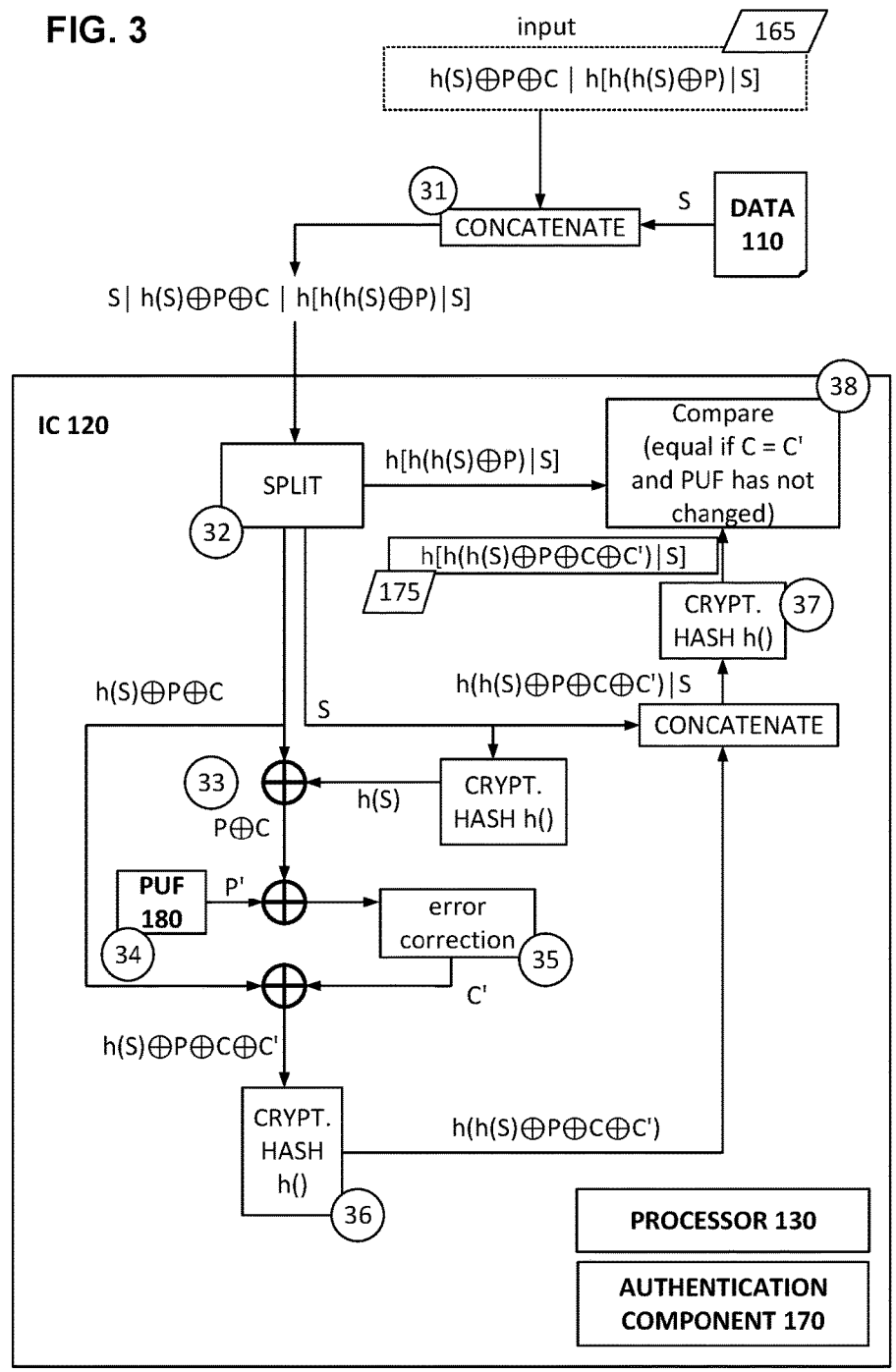
FIG. 3 illustrates a schematic of an authentication operation in a strict hardware to data binding operation, according to an embodiment.

FIGS. 2 and 3 illustrate embodiments termed "strict hardware to data binding". The embodiments presented in FIGS. 2 and 3 can provide authentication but not data confidentiality.

FIG. 2 illustrates an enrollment operation being performed, wherein the data 110 is being bound to the IC 120. The respective acts 21-27 can be performed (e.g., generation of an enrollment value, key calculation, etc.), by the processor 130, e.g., operating in conjunction with the data 110, and/or the PUF 180, wherein the processor 130 is executing the enrollment component 160. It is to be understood, however, that the below functionality may be performed partially or entirely in hardware.

At 21, data 110 is received at the IC 120, wherein data 110 has a data signature S.

At 22, a first instance of a cryptographic hash h(S) is generated by executing a hash function over S.

At 23, a first output value P is generated from the PUF 180 (e.g., in response to a stimulus applied to the PUF 180).

At 24, a code word C is generated from an error correcting code.

At 25, from h(S), P, and C, $h(S) \oplus P \oplus C$ is generated with respective exclusive OR (XOR) logical operators, termed herein "public data".

At 26, a keyed hash $h_k(S)$ is calculated based upon S and a key k generated from $h(P \oplus h(S))$. The keyed hash is unique to the combination of the data signature S and the key k. The keyed hash is denoted $h[h(h(S) \oplus P)|S]$ in FIG. 2.

At 27, the public data $h(S) \oplus P \oplus C$ generated at act 25 is concatenated with the keyed hash $h_k(S)$ generated at act 26, forming $h(S) \oplus P \oplus C | h_k(S)$ (enrollment value 165), denoted as $h(S) \oplus P \oplus C | h[h(h(S) \oplus P|S]$ in FIG. 2. Upon publication of the enrollment value 165, the enrollment value 165 can be stored in the memory 140, in a memory communicatively coupled to the IC 120, e.g., a flash drive, a server on a network on which the IC 120 resides, etc. In an embodiment, the enrollment value 165 does not have to be stored in a protected manner.

FIG. 3 illustrates an authentication operation being performed to confirm binding of the data 110 to the IC 120, and further, that neither the data 110 and/or the IC 120 have been modified between the generation of the enrollment value 165 and the authentication operation. The respective acts 31-38 can be performed (e.g., key authentication, etc.), by the processor 130, e.g., operating in conjunction with the data 110, and/or the PUF 180, wherein the processor 130 is executing the authentication component 170. In other examples, one or more of such acts can be performed in hardware.

At 31, the enrollment value 165 is received and concatenated with the data 110, S, to form $S|h(S)\oplus P\oplus C|h_k(S)$, denoted as $S|h(S)\oplus P\oplus C|h[h(h(S)\oplus P)|S]$ in FIG. 3.

At 32, a splitting operation is performed resulting in the formation of respective components $h(S)\oplus P\oplus C$, $h_k(S)$, and S. The $h_k(S)$ key is forwarded for comparison.

At 33, utilizing the $h(S)\oplus P\oplus C$ component, $h(S)\oplus(h(S)\oplus P\oplus C)=P\oplus C$ is calculated.

At 34, the PUF 180 is re-stimulated to generate a response value P', wherein P' indicates a current state of the PUF 180. Ideally, if no modification of the PUF 180 has occurred since the initial generation of the enrollment value 165, then P=P' with a tolerable degree of noise (operational error), as encountered with fuzzy extraction technologies. If the PUF 180 has been modified, then P≠P', wherein the difference between P and P' is greater than the tolerable degree of noise.

At 35, any noise associated with the P' value can be determined, and based thereon, a degree of effect of noise in the P' value on the error code value C can be determined, wherein the error is $e=P'\oplus P$. The calculation $P'\oplus P\oplus C=C\oplus e$ is performed.

At 36, C is recovered with the error correcting code and the calculation $C\oplus[P\oplus h(S)\oplus C]=P\oplus h(S)$ is performed. The $h(h(S)\oplus P\oplus C\oplus C')$ component is generated and forwarded to be concatenated with the S component split at act 32. Concatenation results in a key $h(S)\oplus P\oplus C\oplus C'|S$.

At 37, a key $h[h(h(S)\oplus P\oplus C\oplus C')|S]$ is formed from applying a cryptographic hash to the key $h(S)\oplus P\oplus C\oplus C'|S$ generated at act 36. In an embodiment, the key $h(S)\oplus P\oplus C\oplus C'|S$ can be considered to be the authentication value 175.

At 38, a keyed hash $h_k(S)$ is calculated from S, and is compared with the $h(S)\oplus P\oplus C\oplus C'|S$ comprising the authentication value 175. The data 110 and the IC 120 are determined to be unmodified based upon the code words C=C', and a difference between P and P' being within an acceptable magnitude of error and S being unmodified. Hence, per FIG. 3, $h[h(h(S)\oplus P)|S]$ (from the key 165) equals $h[h(h(S)\oplus P\oplus C\oplus C')|S]$ (from the key 175) when C=C', the respective values for P cancel out, and accordingly, S is common to both keys.

During the enrollment operation presented in FIG. 2, at act 25, the processor 130 calculates the public data $h(S)\oplus P\oplus C$. This public data can be used by the IC 120 during acts 33 and 36 to recover the PUF value P of the PUF 180. It is this modification to standard fuzzy extraction helper data that binds the data signature S to the IC 120 such that a modification(s) to the IC 120 prevents recovery of the PUF value P. As a result, if either the data 110 or the IC 120 is changed, then the PUF value P will not be correctly recovered in act 36 of the authentication operation presented in FIG. 3. This can prevent recovery of the key k used for the keyed hash, and so the data 110 will not be authenticated. The IC 120 can then respond appropriately, for example, by refusing to utilize the data 110.

Figure 4:
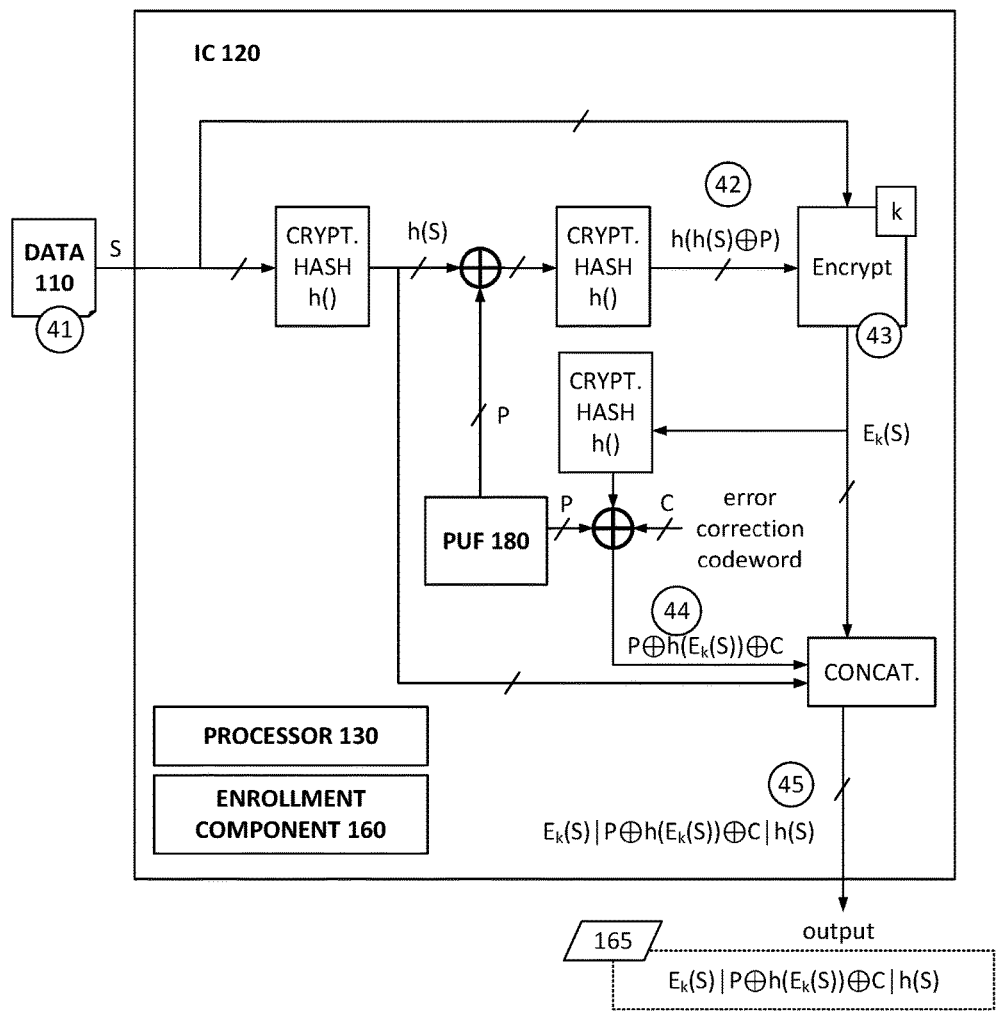
FIG. 4 illustrates a schematic of an encrypted enrollment operation in a strict hardware to data binding operation, according to an embodiment.
Figure 5:
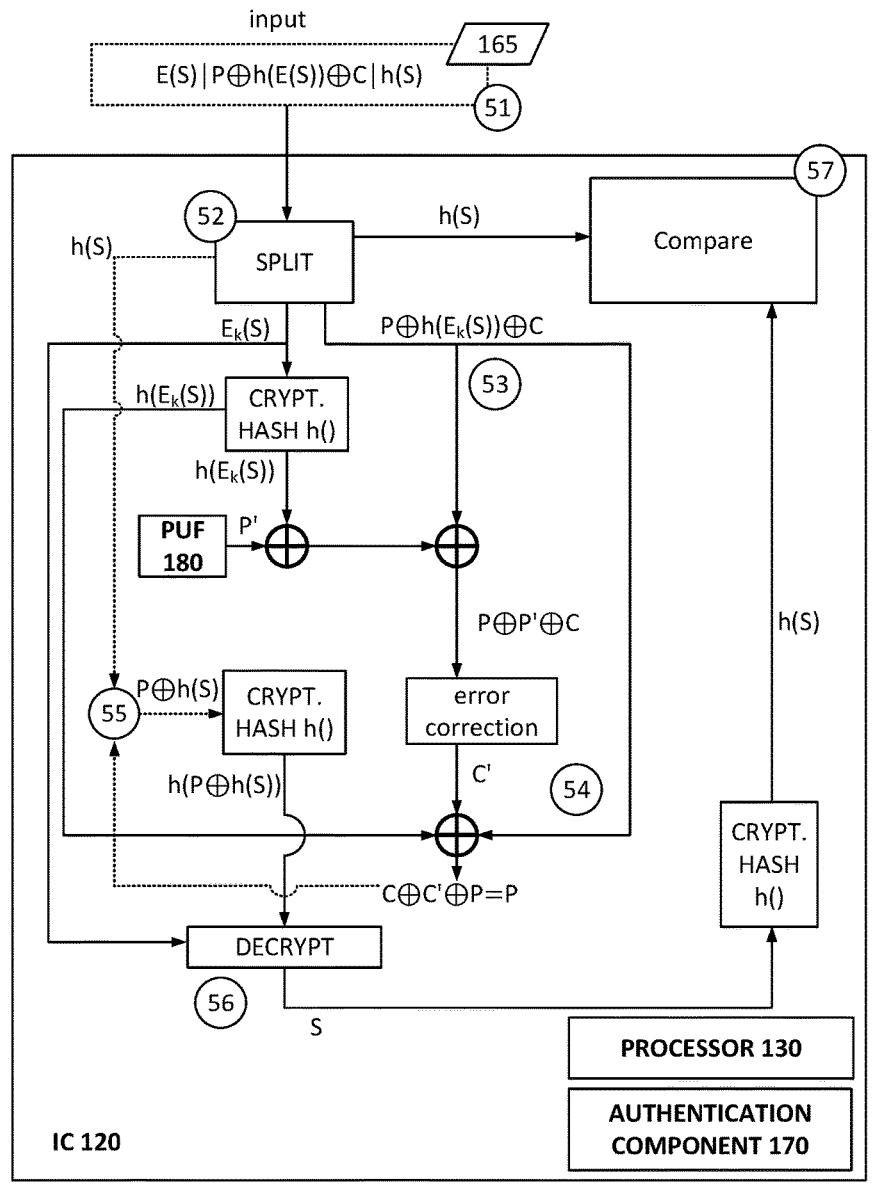
FIG. 5 illustrates a schematic of an authentication operation in an encrypted strict hardware to data binding operation, according to an embodiment.

The embodiments presented in FIGS. 2 and 3 can be modified to incorporate encryption. Encryption can enable protection of both the integrity and the confidentiality of the data 110 and can prevent devices other than the device (e.g., IC 120) with which the data 110 is originally enrolled from utilizing the data 110. FIGS. 4 and 5 illustrate embodiments where encryption is being utilized as part of the enrollment and authentication operations.

FIG. 4, illustrates the encrypted enrollment operation being performed, wherein at 41, data 110 having a data signature S is sent to IC 120.

At 42, $h(h(S)\oplus P)$ is calculated and a key k is generated from the value of $h(h(S)\oplus P)$.

At 43, the data 110 is encrypted by calculating $E_k(S)$ from the key k.

At 44, $P\oplus h(E_k(S))\oplus C$ is calculated.

At 45, $P\oplus h(E_k(S))\oplus C$, $E_k(S)$, and $h(S)$ are concatenated and published as $E_k(S)|P\oplus h(E_k(S))\oplus C|h(S)$.

FIG. 5, illustrates an authentication operation being performed, wherein at 51, $E_k(S)|P\oplus h(E_k(S))\oplus C|h(S)$ is sent to IC 120.

At 52, $E_k(S)|P\oplus h(E_k(S))\oplus C|h(S)$ is split into its respective components for subsequent processing. As shown, a first instance of h(S) is made available for comparison (as further described at act 57) and a second instance of h(S) is made available for recovery of k (as further described at act 55).

At 53, $h(E_k(S))\oplus P'\oplus[P\oplus h(E_k(S))\oplus C]=C\oplus e$ is calculated.

At 54, C is recovered with the error correcting code and $C\oplus[P\oplus h(E_k(S))\oplus C]\oplus h(E_k(S))=P$ is calculated.

At 55, $h(P\oplus h(S))$ is calculated and k is recovered, wherein $h(P\oplus h(S))$ is calculated based upon h(S) provided at act 52, and P calculated at act 54 (as shown by the respective hashed lines).

At 56, $E_k(S)$ is decrypted.

At 57, h(S) is calculated and a comparison performed between the h(S) component received at act 52, and the h(S) component generated by hashing S at act 57.

The enrollment phase of the embodiment presented in FIG. 4 is similar to embodiment presented in FIG. 2, except that the key k can be utilized to encrypt the data 110, rather than to compute a keyed hash. Accordingly, after the enrollment phase presented in FIG. 4, the unencrypted data S is no longer needed.

At act 53 of the authentication procedure presented in FIG. 5, the IC 120 can combine its noisy PUF measurement P' with a hash of the encrypted data and the modified helper data $P\oplus h(E_k(S))\oplus C$. After recovering C, the initial PUF P measurement can be reproduced in act 54. Note that in act 54 of the authentication operation, P is correct if the encrypted data is authentic and if the IC 120 has not been modified. Act 57 can verify that the decrypted data is authentic. In the embodiment presented in FIGS. 4 and 5, the data 110 can be bound to the IC 120, which can prevent the data 110 from being utilized by (e.g., executing on) any other hardware, and does not require any secret values to be stored or shared.

In other embodiments, keys can be generated from $h(P\oplus h(S))$. The XOR logic is not necessary and can be replaced with some other combination of P and h(S), such as concatenation, logical AND, addition, etc.

FIGS. 2-5 present embodiments termed strict hardware to data binding, the following FIGS. 6-9 present embodiments termed relaxed hardware to data binding. In the embodiments presented in FIGS. 2-5 the fuzzy extractor helper data can be modified by including the data signature. Such approaches can bind the hardware (e.g., IC 120) and the data (e.g., data 110) by preventing the correct PUF value from being output by the fuzzy extraction recovery procedure if either the hardware or the data has been modified. In various embodiments, the binding between the data and the hardware can be relaxed by removing the data signature from the PUF's helper data. As such, the PUF 180 can be reproduced correctly even if the data is modified. However, the encryption keys are generated from both the data signature and the PUF response, achieving a cryptographic binding. As with the embodiments presented in FIGS. 2-5, various embodiments that can provide relaxed binding can also protect data integrity, and various embodiments can further protect both integrity and confidentiality.

Figure 6:
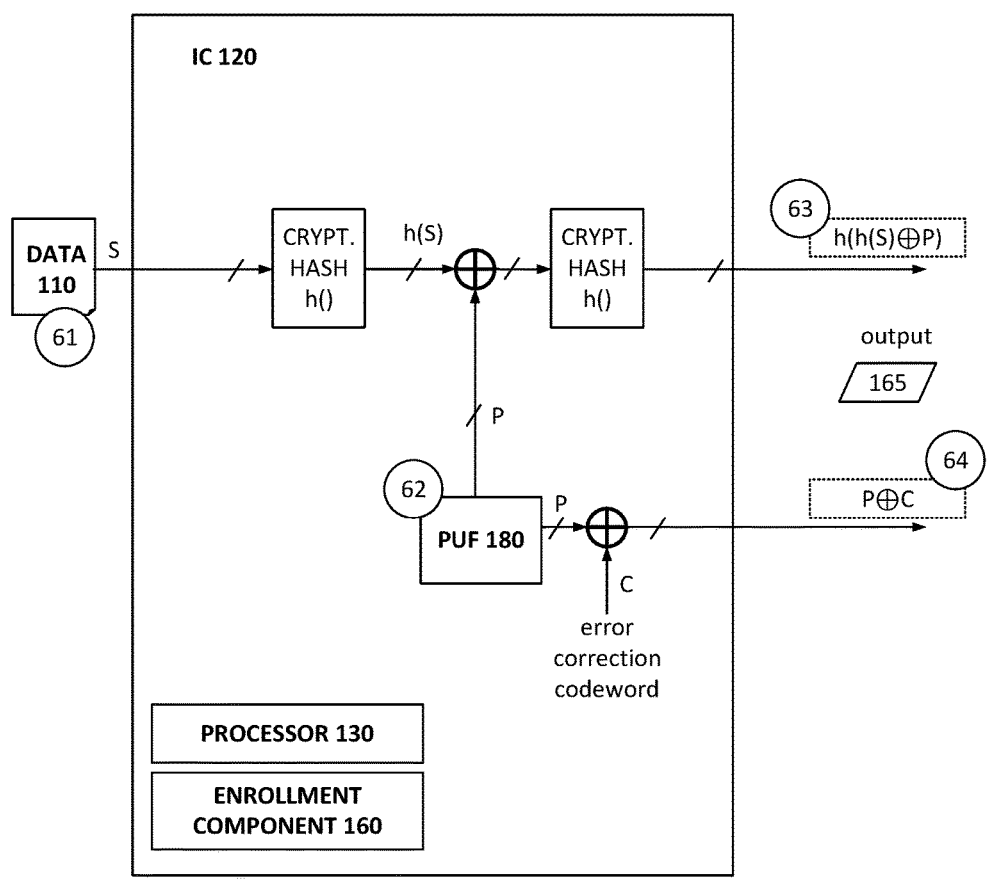
FIG. 6 illustrates a schematic of an enrollment operation in a relaxed hardware to data binding operation, according to an embodiment.
Figure 7:
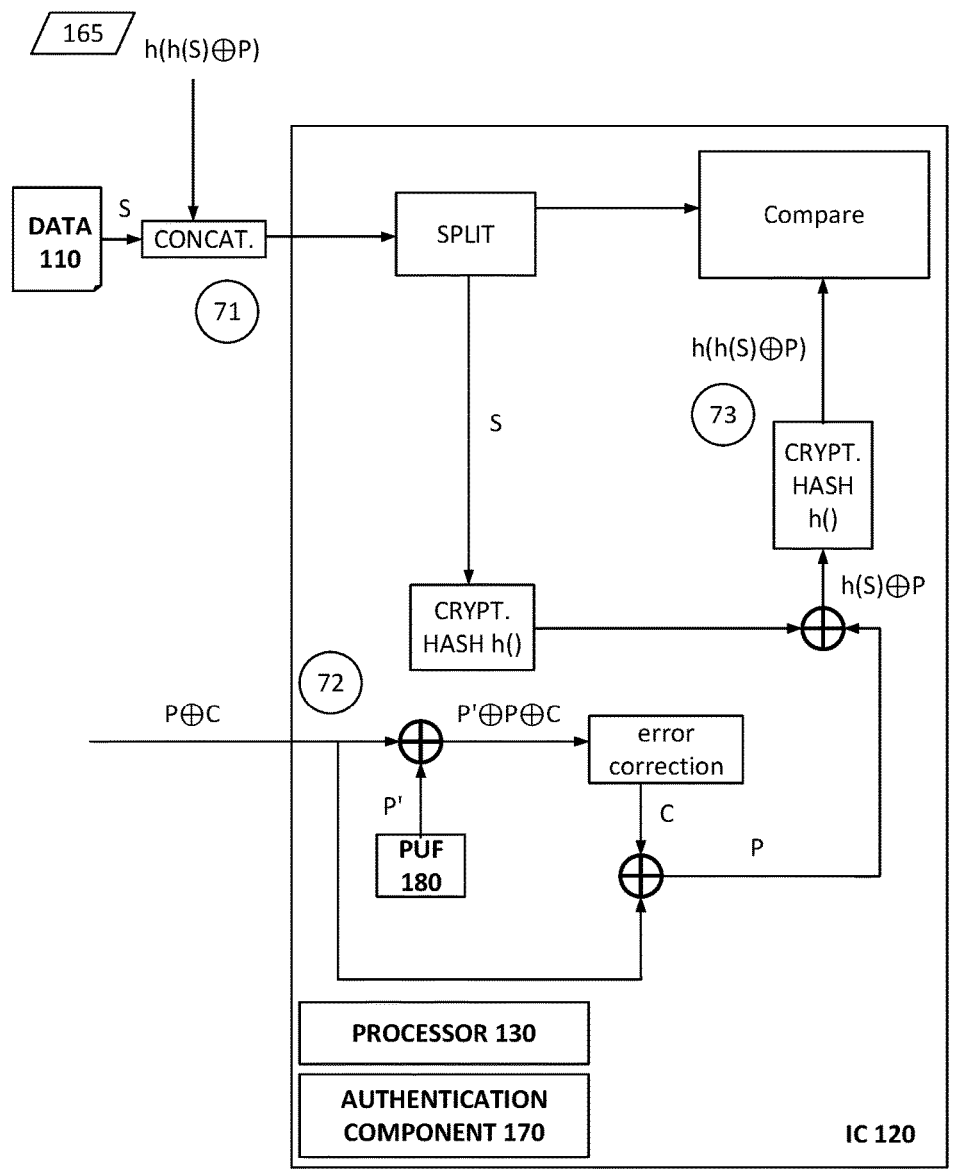
FIG. 7 illustrates a schematic of an authentication operation in a relaxed hardware to data binding operation, according to an embodiment.

FIGS. 6 and 7 present an embodiment that can enable the PUF 180 (e.g., PUF value P) to be recovered independently of the data signature (e.g., S), and can protect the integrity of the data but not its confidentiality.

FIG. 6 illustrates the enrollment operation being performed, wherein at 61, data 110 having a data signature S is received at IC 120.

At 62, the PUF 180 is stimulated to generate a response value P.

At 63, the $h(h(S) \oplus P)$ value is calculated based upon hashing S and P, wherein the $h(h(S) \oplus P)$ value is published.

At 64, a code word C is selected from an error correction code, and based thereon, a value $P \oplus C$ is calculated and published.

FIG. 7 illustrates the authentication operation being performed, wherein at 71, the $h(h(S) \oplus P)$ value generated at act 63 is received at the IC 120 is concatenated with S, to form $S|h(h(S) \oplus P)$.

At 72, the value $P \oplus C$ generated at act 64 is utilized to recover P through a normal fuzzy extraction procedure.

At 73, $h(h(S) \oplus P)$ is calculated, and a comparison performed between this value and the $h(h(S) \oplus P)$ value received at act 71.

In an embodiment, the integrity of the data can be protected by the hash $h(h(S) \oplus P)$. Here, if the comparison in act 73 of the authentication process is correct then the data 110 is authenticated, and a determination can be made that neither the hardware (e.g., IC 120) nor the data (e.g., data 110) has been modified.

In a further embodiment, a keyed hash can be utilized in conjunction with one or more of the acts presented in FIGS. 6 and 7. In the following embodiment the enrollment operation is based upon acts 61-64 of FIG. 6, however operations performed at act 63 will be replaced with key generation and hashing operations 63A and 63B.

At 61, data 110 having a data signature S is received at IC 120.

At 62, the PUF 180 is stimulated to generate a response value P.

At 63A, rather than the $h(h(S) \oplus P)$ value being calculated and published (per act 63), a key $h(P \oplus h(S))$ is calculated, and a key k is generated from this value.

At 63B, a keyed hash $h_k(S)$ is calculated and this value is published.

At 64, a code word C is selected from an error correction code, and based thereon, a value $P \oplus C$ is calculated and published.

Further, the following authentication operation is based upon acts 71-73 of FIG. 7, but a keyed hash $h_k(S)$ is utilized instead of the $h(h(S) \oplus P)$ utilized in acts 71-73. Hence, the authentication acts become:

At 71A, $S|h_k(S)$ is received at the IC 120.

At 72, the value $P \oplus C$ generated at act 32 is utilized to recover P through a normal fuzzy extraction procedure.

At 73A, $h(P \oplus h(S))$ is calculated and the key recovered.

At 73B, a keyed hash $h_k(S)$ is calculated and a comparison performed between the newly calculated keyed hash $h_k(S)$ and the keyed hash $h_k(S)$ calculated at act 63B.

Figure 8:
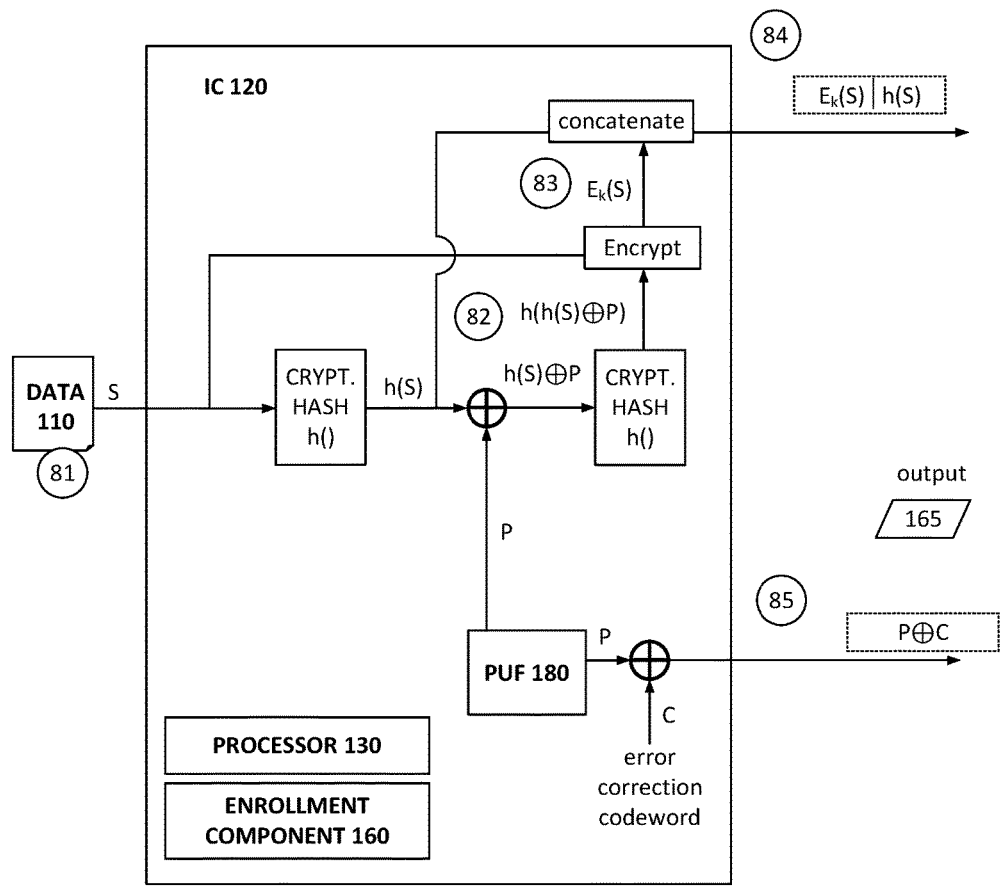
FIG. 8 illustrates a schematic of an encrypted enrollment operation in a relaxed hardware to data binding operation, according to an embodiment.
Figure 9:
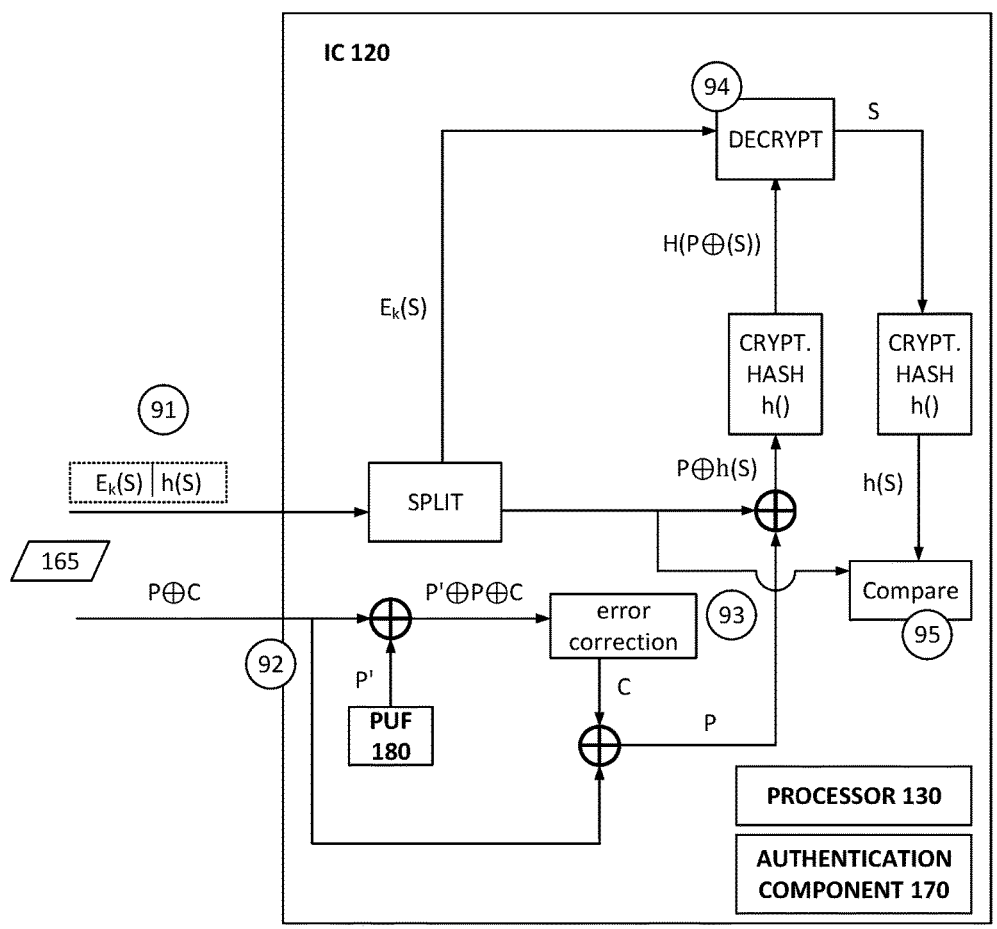
FIG. 9 illustrates a schematic of an authentication operation in an encrypted relaxed hardware to data binding operation, according to an embodiment.

A modification can be made to the foregoing embodiments to enable protection of both the integrity and the confidentiality of the data 110. By applying encryption, other hardware can be prevented from utilizing the data 110. Turning to FIGS. 8 and 9

FIG. 8 presents an embodiment illustrating an enrollment operation being performed, wherein at 81, data 110 having a data signature S is received at IC 120.

At 82, the value $h(h(S) \oplus P)$ is calculated and a key k from this value is generated.

At 83, the data signature S is encrypted as $E_k(S)$ with the key k generated at act 82.

At 84, the encryption $E_k(S)$ is concatenated with h(S), and published as $E_k(S)|h(S)$.

At 85, a code word C is selected from an error correction code, $P \oplus C$ is calculated and published.

FIG. 9 presents an embodiment illustrating an authentication operation being performed, wherein at 91, the $E_k(S)|h(S)$ concatenation is received at the IC 120.

At 92, $P \oplus C$ is utilized to recover P through a normal fuzzy extraction procedure.

At 93, $h(P \oplus h(S))$ is calculated and the key k recovered.

At 94, $E_k(S)$ is decrypted.

At 95, h(S) is calculated and a comparison performed between the newly calculated hash h(S) and the hash h(S) utilized at act 84.

The embodiments presented in FIGS. 8 and 9 can achieve similar protections to those presented in FIGS. 4 and 5; if the hash in act 95 of the authentication matches the publically stored value then the data (e.g., data 110) is the same data that was enrolled, and because the key was correctly recovered it can be determined that the hardware (e.g., IC 120) has not changed. The embodiment presented in FIGS. 8 and 9 differs from the embodiment in FIGS. 4 and 5 in that the fuzzy extraction operation can be a standard PUF fuzzy extraction, rather than a fuzzy extraction that combines the PUF output with the data signature, as such it is possible for the IC 120 to recover its PUF independently of the data 110.

It is to be noted that the foregoing embodiments make use of the value $h(P \oplus h(S))$. The XOR operation is not a requirement and can be replaced with any combination of P and h(S).

As shown in FIGS. 2, 4, 6, and 8, an enrollment component 160 is presented, wherein the processor 130 can operate in combination with the enrollment component 160, the data 110, and/or the PUF 180, to perform the respective acts (e.g., generation of the enrollment value 165, etc.) presented in FIGS. 2, 4, 6, and 8. In an embodiment, the processor 130 is executing the enrollment component 160. It is to be understood, however, that the respective functionality may be performed partially or entirely in hardware.

Further, as shown in FIGS. 3, 5, 7, and 9, an authentication component 170 is presented, wherein the processor 130 can operate in combination with the authentication component 170, the data 110, and/or the PUF 180, to perform the respective acts (e.g., authentication of the enrollment value, etc.) presented in FIGS. 3, 5, 7, and 9. In an embodiment, the processor 130 is executing the authentication component 170. It is to be understood, however, that the respective functionality may be performed partially or entirely in hardware.

Figure 10:
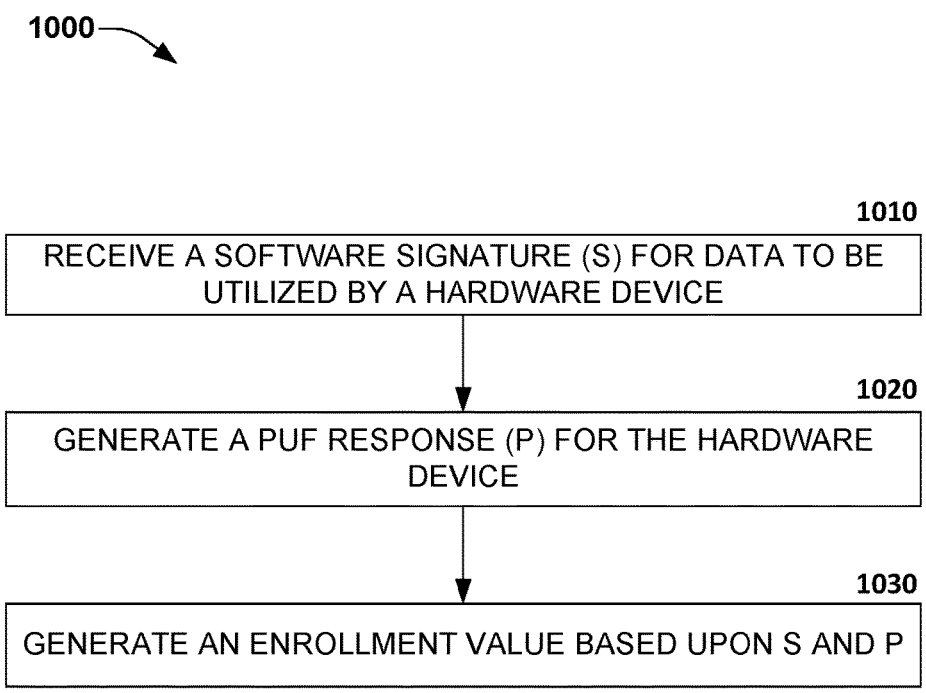
FIG. 10 illustrates a methodology for enrolling data with a hardware device that will execute the data.
Figure 11:
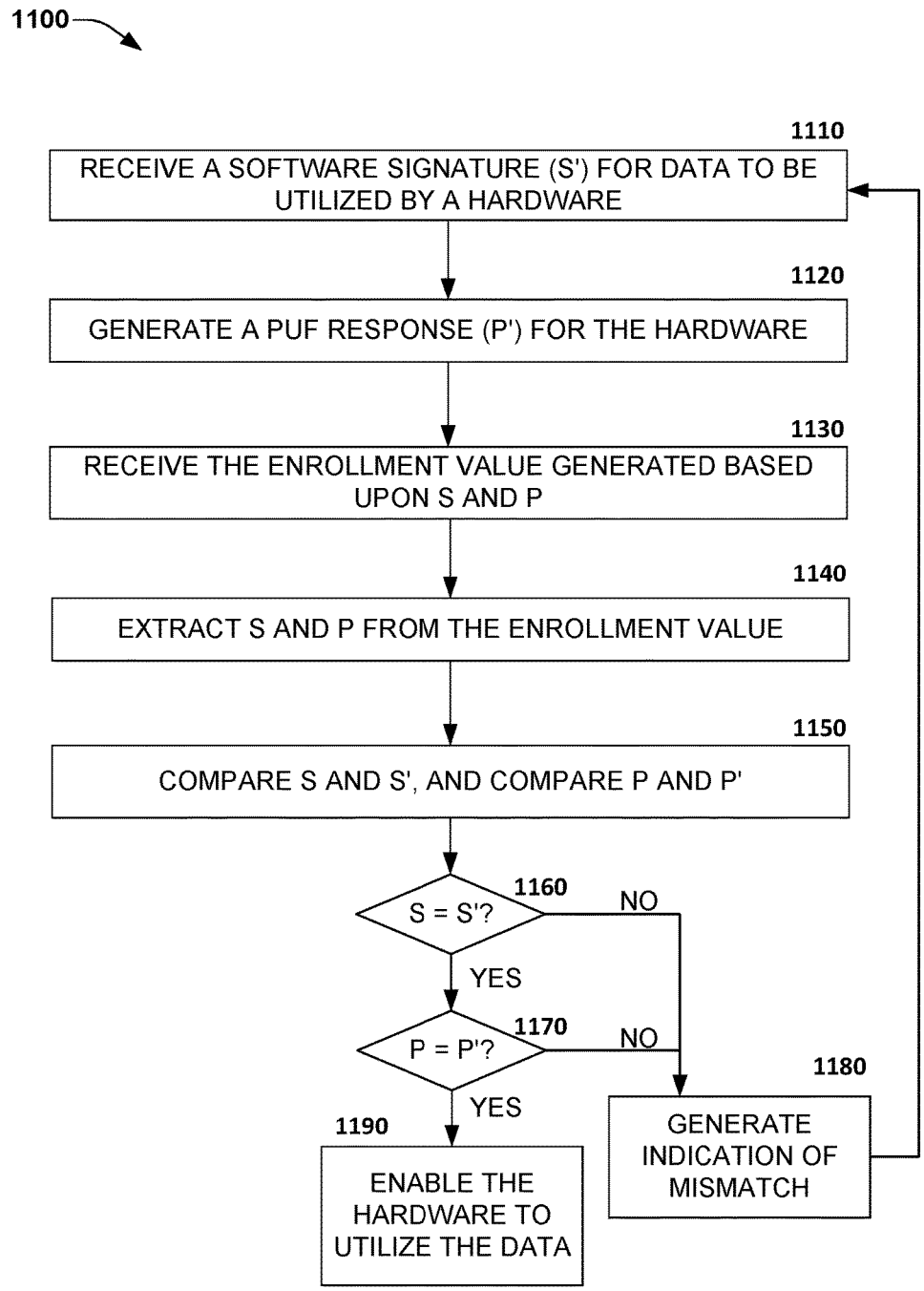
FIG. 11 illustrates a methodology for authenticating data and hardware.

FIGS. 10 and 11 illustrate exemplary methodologies relating to binding data to hardware, wherein the data is to execute on the hardware. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 10 illustrates a methodology 1000 for enrolling data with hardware, wherein the data is to be utilized by the hardware. In an embodiment, the hardware is utilized to secure the data, such that the hardware will not utilize (e.g., execute) the data in the event that the data and/or the hardware has been modified between enrolling the data with the hardware and a subsequent authentication operation.

At 1010, a data signature S is generated for the data that is to be utilized by a hardware device.

At 1020, a PUF response is generated, wherein the PUF response is generated by a PUF located on the hardware device. In an embodiment, the PUF response is based upon an operational state of the PUF and/or the hardware device. Hence, if either, or both, of the PUF and/or the hardware device are modified then the PUF response is altered from a PUF response that would be obtained if the PUF and the hardware device were in their original, unmodified states.

At 1030, an enrollment value is generated based upon a combination of S and P.

FIG. 11 illustrates a methodology 1100 for authenticating a data with a hardware device, wherein the data is to be utilized by the hardware device. As previously mentioned, if either of the hardware device or the data have been modified since the data was enrolled with the hardware device, the hardware device is prevented from utilizing the data. At 1110, a data signature S' is obtained (e.g., generated/received) for the data that is to be utilized by the hardware.

At 1120, a PUF response P' is generated, wherein P' is generated by the PUF located on the hardware.

At 1130, the enrollment value generated during the enrollment process (e.g., as described in methodology 1000) is obtained. As previously described, the enrollment value comprises values for S and P obtained during the enrollment of the data with the hardware.

At 1140, S and P are extracted from the enrollment value obtained at 1130.

At 1150, an authentication operation is performed wherein the PUF response P extracted from the enrollment value and the newly generated PUF response P' are compared, and further, the data signature S extracted from the enrollment value and the newly generated data signature S' are also compared.

At 1160, a determination is made regarding whether S=S'? In the event that S≠S', then the methodology advances to 1180, whereupon a notification can be generated indicating that owing to S≠S' it is presumed that the data has been modified between generation of S and S'. Accordingly, the data can be prevented from being utilized by the hardware. The methodology can return to 1120, whereupon a further data signature S' can be generated, and the authentication process repeated.

Further, at 1160, in response to a determination that S=S' the methodology can advance to 1170, wherein a determination can be made whether P=P'? In the event that P≠P', then the methodology advances to 1180, whereupon a notification can be generated indicating that owing to P≠P' it is presumed that the hardware has been modified between generation of P and P'. Accordingly, the hardware can be prevented from utilizing the data. The methodology can return to 1120, whereupon a further data signature S' can be generated, and the authentication process repeated. In response to a determination that P=P' (and the previously determined S=S') the hardware and data are determined to be in respectively unmodified states and the data can be utilized by the hardware. At 1170, in the event of P≠P', the authentication process can be repeated to confirm that the PUF value P' is correct. For example, the PUF (and the hardware) may have changed temperature during operation, and repeating the authentication process may subsequently result in the V being correctly generated once the operating temperature of the PUF returns to the operating temperature when the PUF value P was first generated during the enrollment process.

Figure 12:
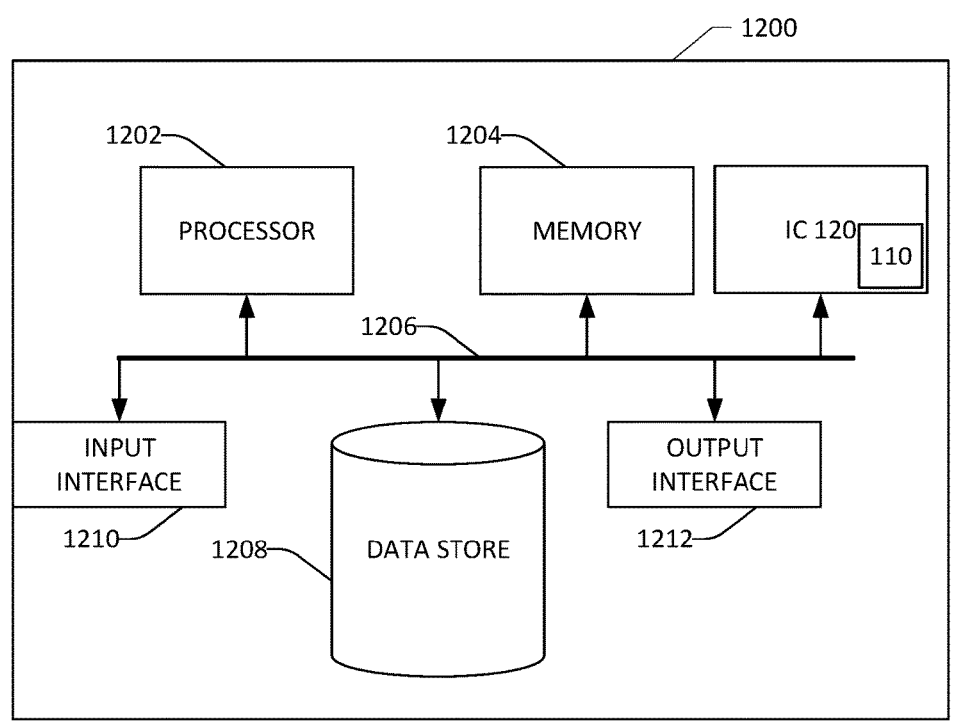
FIG. 12 illustrates an exemplary computing device.

Referring now to FIG. 12, a high-level illustration of an exemplary computing device 1200 that can be used in accordance with the systems and methodologies disclosed herein is illustrated. For example, the computing device 1200 includes the IC 120, wherein data 110 is to execute on the IC 120. The computing device 1200 includes at least one processor 1202 (e.g., operating as processor 130) that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store operating parameters, required operating parameters, and so forth.

The computing device 1200 additionally includes a data store 1208 that is accessible by the processor 1202 by way of the system bus 1206. The data store 1208 may include executable instructions, operating parameters, required operating parameters, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc., by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   receiving an authentication data signature and an enrollment value at a hardware device during an authentication phase for data and the hardware device, wherein the enrollment value is based on a combination of an enrollment data signature and a first physical unclonable function (PUF) signature, the first PUF signature being a value outputted by a PUF of the hardware device during an enrollment phase for binding the data to the hardware device, the enrollment data signature being generated based on the data during the enrollment phase for binding the data to the hardware device, and the authentication data signature being generated based on the data for the authentication phase;
   analyzing, utilizing the hardware device during the authentication phase for the data and the hardware device, the authentication data signature and the enrollment value to determine whether at least one of the data or the hardware device has been modified since the enrollment phase;
   in response to determining that at least one of the data or the hardware device has been modified since the enrollment phase, preventing the data from being utilized on the hardware device; and
   in response to determining that neither the data nor the hardware device has been modified since the enrollment phase, utilizing the data on the hardware device.

2. The method of claim 1, further comprising, in response to determining that neither the data nor the hardware device has been modified since the enrollment phase, generating an indication that both the data and the hardware device are in an unmodified state.

3. The method of claim 1, further comprising applying a hash function to at least one value included in the data during the authentication phase to generate the authentication data signature, wherein the hash function is applied to the at least one value included in the data during the enrollment phase to generate the enrollment data signature.

4. The method of claim 1, further comprising:
   determining an acceptable degree of operational error of the PUF;
   generating a second PUF signature;
   comparing the second PUF signature with the first PUF signature;
   determining a difference between a magnitude of the second PUF signature and a magnitude of the first PUF signature exceeds the acceptable degree of operational error of the PUF;
   in response to determining the difference between the magnitude of the second PUF signature and the magnitude of the first PUF signature exceeds the acceptable degree of operational error of the PUF, preventing the data from being utilized on the hardware device; and
   in response to determining the difference between the magnitude of the second PUF signature and the magnitude of the first PUF signature does not exceed the acceptable degree of operational error of the PUF, utilizing the data on the hardware device.

5. The method of claim 1, wherein the enrollment value is further based on a code word from an error correcting code.

6. The method of claim 1, wherein the hardware device is an integrated circuit configured to utilize the data.

7. A hardware device, comprising:
   at least one processor; and
   memory, wherein the memory comprises instructions that, when executed by the at least one processor, cause the at least one processor to perform acts comprising:
      analyzing, during an authentication phase for data and the hardware device, an authentication data signature and an enrollment value to determine whether at least one of the data or the hardware device has been modified since an enrollment phase for binding the data to the hardware device, wherein the authentication data signature and the enrollment value are received at the hardware device during the authentication phase, the enrollment value is based on a combination of an enrollment data signature and a first physical unclonable function (PUF) signature, the first PUF signature being a value outputted by a PUF of the hardware device during the enrollment phase, the enrollment data signature being generated based on the data during the enrollment phase, and the authentication data signature being generated based on the data for the authentication phase;
      in response to determining that at least one of the data or the hardware device has been modified since the enrollment phase, preventing the data from being utilized on the hardware device; and
      in response to determining that neither the data nor the hardware device has been modified since the enrollment phase, utilizing the data on the hardware device.

8. The hardware device of claim 7, the acts further comprising, in response to determining that neither the data nor the hardware device has been modified since the enrollment phase, generating an indication that both the data and the hardware device are in an unmodified state.

9. The hardware device of claim 7, wherein the authentication data signature is generated by applying a hash function to at least one value included in the data during the authentication phase, and the enrollment data signature is generated by applying the hash function to the at least one value included in the data during the enrollment phase.

10. The hardware device of claim 7, the acts further comprising:
- determining an acceptable degree of operational error of the PUF;
- generating a second PUF signature;
- comparing the second PUF signature with the first PUF signature;
- determining a difference between a magnitude of the second PUF signature and a magnitude of the first PUF signature exceeds the acceptable degree of operational error of the PUF;
- in response to determining the difference between the magnitude of the second PUF signature and the magnitude of the first PUF signature exceeds the acceptable degree of operational error of the PUF, preventing the data from being utilized on the hardware device; and
- in response to determining the difference between the magnitude of the second PUF signature and the magnitude of the first PUF signature does not exceed the acceptable degree of operational error of the PUF, utilizing the data on the hardware device.

11. The hardware device of claim 7, wherein the enrollment value is further based on a code word from an error correcting code.

12. The hardware device of claim 7, wherein the hardware device is an integrated circuit configured to utilize the data.

13. The method of claim 1, wherein:
- the authentication data signature is generated during the authentication phase by applying a hash function to the data which is encrypted; and
- the enrollment data signature is generated during the enrollment phase by applying the hash function to the data which is encrypted.

14. The method of claim 1, further comprising, in response to determining that at least one of the data or the hardware device has been modified since the enrollment phase, generating an indication that at least one of the data or the hardware device has been modified.

15. The method of claim 1, wherein the enrollment value is published by the hardware during the enrollment phase.

16. The hardware device of claim 7, wherein the enrollment value is stored in memory separate from and communicatively coupled to the hardware device subsequent to the enrollment phase.

17. The hardware device of claim 7, wherein:
- the authentication data signature is generated during the authentication phase by applying a hash function to the data which is encrypted; and
- the enrollment data signature is generated during the enrollment phase by applying the hash function to the data which is encrypted.

* * * * *